United States Patent [19]
Nyberg et al.

[11] Patent Number: 5,568,042
[45] Date of Patent: Oct. 22, 1996

[54] MONITORING AND CONTROL OF A FILTER IN A POWER NETWORK

[75] Inventors: Krister Nyberg, Smedjebacken; Urban Åstråm, Saxdalen, both of Sweden

[73] Assignee: ASEA Brown Boveri AB, Vasteras, Sweden

[21] Appl. No.: 305,328

[22] Filed: Sep. 15, 1994

[30] Foreign Application Priority Data

Sep. 20, 1993 [SE] Sweden ................... 93030500

[51] Int. Cl.⁶ ........................... G05F 1/70
[52] U.S. Cl. ............ 323/211; 323/218; 323/233; 327/553
[58] Field of Search ................ 327/552, 551, 327/553; 307/105, 106, 108; 323/209, 210, 211, 218, 233; 363/39, 71

[56] References Cited

U.S. PATENT DOCUMENTS 4,811,236  3/1989  Brennen et al. .............. 323/210
5,351,181  9/1994  Brennen et al. .............. 363/71

Primary Examiner—Robert Nappi
Assistant Examiner—Shawn Riley
Attorney, Agent, or Firm—Watson Cole Stevens Davis, PLLC

[57] ABSTRACT

In a method for monitoring and/or control of a plant component (4A, 4B, 4C, 4D) connected to an electric power network (N1, N2), for example a tunable filter for harmonic filtering or a capacitor bank for generating reactive power in a converter plant for high-voltage direct current, products of, respectively, a voltage ($U_A$, $U_B$, $U_C$, $U_D$) occurring in the plant component and of a current ($I_A$, $I_B$, $I_C$, $I_D$, $I_{AC}$) flowing therethrough are formed, and sine and cosine signals, the frequencies of which are equal to the product of the ordinal number of a selected tone and a fundamental frequency associated with the power network, the products are integrated and the phase difference ($\phi_{un}$-$\phi_{In}$) and/or the amplitude value (SUn, SIn, respectively) between/for the components of the voltage and the current of the selected tone are formed by quotient generation, multiplication, and summation of the integrated products.

22 Claims, 4 Drawing Sheets

MONITORING AND CONTROL OF A FILTER IN A POWER NETWORK

TECHNICAL FIELD

The present invention relates to a method and a device for monitoring and control of a plant component connected to an electric power network, for example a filter arranged in a converter plant for high-voltage direct current for harmonic filtering or a capacitor bank for generating reactive power.

BACKGROUND ART

A converter connected to an a.c. network, for example a converter included in a converter plant for high-voltage direct current, generates, by its principle of operation, harmonic currents on its a.c. side and harmonic voltages on its d.c. voltage side. In this context, in principle, only harmonics to the fundamental feequency of the a.c. network of the orders $n=kp\pm1$ occur on the a.c. side and of the orders $n=kp$ on the d.c. voltage side, p being the pulse number of the converter and k being a positive integer. Harmonics of other orders may also occur in power networks of this kind, caused by, for example, unsymmetries between the phases of the a.c. network.

To reduce the stresses on components included in the power network, and originating from the harmonics, and to fulfil the requirements made on the effect on the network and telecommunication disturbances, shunt-connected filters are therefore generally installed to limit the propagation of the disturbances in the power network. Harmonics of a lower order, for example those which correspond to k=1 and for 6-pulse converters also k=2, are generally filtered through filters tuned to these harmonics whereas harmonics of a higher order may be filtered through a high-pass filter. The filters are composed of passive components, and during the dimensioning it is also taken into consideration that the filters on the a.c. side are to serve as members for generating reactive power. In general, however, the requirements for generation of reactive power in a converter plant for high-voltage direct power result in the need to install one or more further high-voltage capacitor banks on the a.c. side. In certain cases, it may be necessary to install tuned filters and high-pass filters also on the d.c. voltage side of the converter. In a converter plant for high-voltage direct current, these filters and the capacitor banks constitute plant components which essentially influence the function, volume and cost of the plant.

The tuned filters are generally designed as series-resonance circuits, comprising capacitive, inductive and sometimes also resistive impedance elements, tuned such that, at one or more of the harmonic frequencies expected in the power network, they are to exhibit a purely resistive impedance.

In narrow-band filters also a small change of the reactance of an impedance element included in the filter may cause a considerable deterioration of the function of the filter. Such a change may, for example, be caused by a fault in one part of a capacitive impedance element. A known method for monitoring this type of fault is to sense a voltage occurring in the filter and a current flowing therethrough and to form the phase difference between the components of the voltage and the current of a frequency selected by means of a bandpass filter, corresponding to the harmonic or one of the harmonics to which the filter is tuned. This phase difference shall be zero when the filter is correctly tuned. A state signal formed in dependence on the phase difference is supplied to an alarm unit to release a fault alarm if the phase difference exceeds a predetermined value.

Variations in network frequency and drift in component values, caused by, for example, temperature variations or aging, however, mean that an exact tuning generally cannot be maintained although no direct faults occur in the filter. It has therefore been proposed to provide the filters with tuning units which allow an adjustment of the resonance frequency or frequencies of the filter via a control member which influences the reactive impedance or impedances of the filter. One known method in this connection is to form a state signal in the manner mentioned above, which is supplied to the control member for the purpose of influencing the reactive impedance of the filter such that the phase difference is minimized in magnitude. The tuning units may, for example, comprise a switchblade capacitor bank or a reactor which is controllable by means of a semiconductor connection. A problem in this connection is that conventional methods for phase angle measurement, which are based on measurement of the difference in time between two signals whose frequencies are known only approximately, are very sensitive to frequency deviations. This means that the methods mentioned are less suitable for use in filters with very narrow bands.

To detect a fault in a capacitor bank, the present capacitance thereof can be directly calculated by means of Ohm's law from known amplitude values of current and voltage and be compared with the nominal capacitance value of the capacitor bank. To obtain sufficient sensitivity, however, this method requires that the amplitude values mentioned can be determined with high accuracy.

SUMMARY OF THE INVENTION

The object of the invention is to provide a method of the kind stated in the introductory part of the description, which, for a voltage occurring in the plant component and a current flowing through the plant component, results in a high accuracy in determining the phase difference between the components of the voltage and the current of a selected tone in the power network, and in determining the amplitude of these components. This makes possible a very accurate tuning of tunable filters and a monitoring with high sensitivity of capacitor banks. By a tone in the power network is meant in this context a frequency equal to a fundamental frequency associated with the power network, or an integer multiple of this frequency, the fundamental frequency being of the order n=1. For an a.c. network, fundamental frequency means the system frequency of the network, usually 50 or 60 Hz. For, for example, a d.c. network for transmission of high-voltage direct current, fundamental frequency means the system frequency for the a.c. network which, via the converter, is connected to the d.c. network.

According to the invention, the above object is achieved by forming products between a voltage occurring in the plant component and a current flowing therethrough, respectively, and sine and cosine signals, the frequencies of which are equal to the product of the order of the selected tone and the fundamental frequency associated with the power network, by integrating the products over time, and by determining the above-mentioned phase difference and amplitude values by quotient generation, multiplication, and summing of the integrated products.

Advantageous improvements of the invention will become clear from the following description and the appended claims.

BRIEF DESCRIPTION OF THE DRAWINGS

The invention will be explained in greater detail by description of embodiments with reference to the accompanying drawings, wherein.

DESCRIPTION OF THE PREFERRED EMBODIMENTS

FIG. 1 schematically shows a three-phase electric power network N1 with the phases A, B and C, which is connected over a transformer connection T and a converter SCR to a d.c. power network N2 with the two lines L1, L2. The electric fundamental frequency of the network N1 is designated f. The transformer connection may in a known manner comprise a Y—Y and a Y-$\Delta$-connected transformer for the case where the converter is designed as a 12-pulse connection. A plant component 4A is connected by one of its terminals 41A to the phase A in the network N1 and by its other terminal 42A to the ground G. Plant components 4B and 4C of the same composition as 4A are connected in a similar manner between phase B and ground and between phase C and ground by means of terminals 41B, 41C, 42B, 42C, respectively. One plant component 4D is connected between the lines L1 and L2 in the network N2 by means of terminals 41D and 42D. The line L2 is connected to the ground G.

Figure 1A:
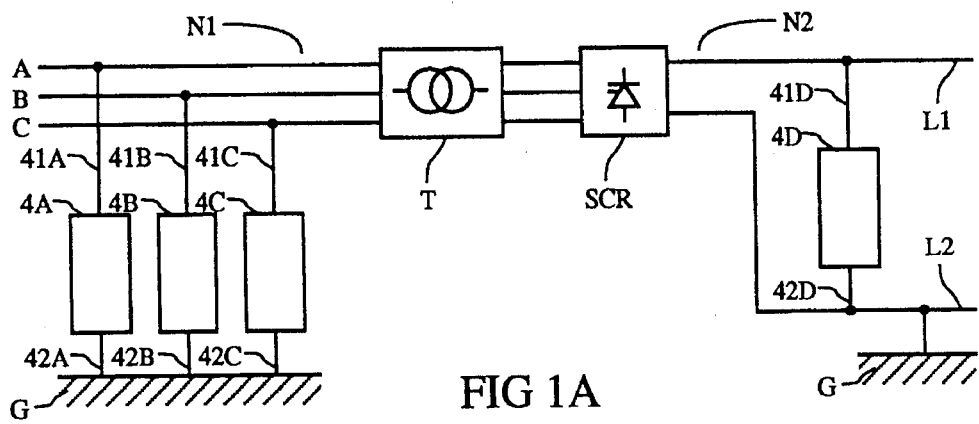
FIG. 1A shows an a.c. network which is connected to a d.c. network via a converter, and filters and/or capacitor banks connected to the network in a known manner.
Figure 1B:
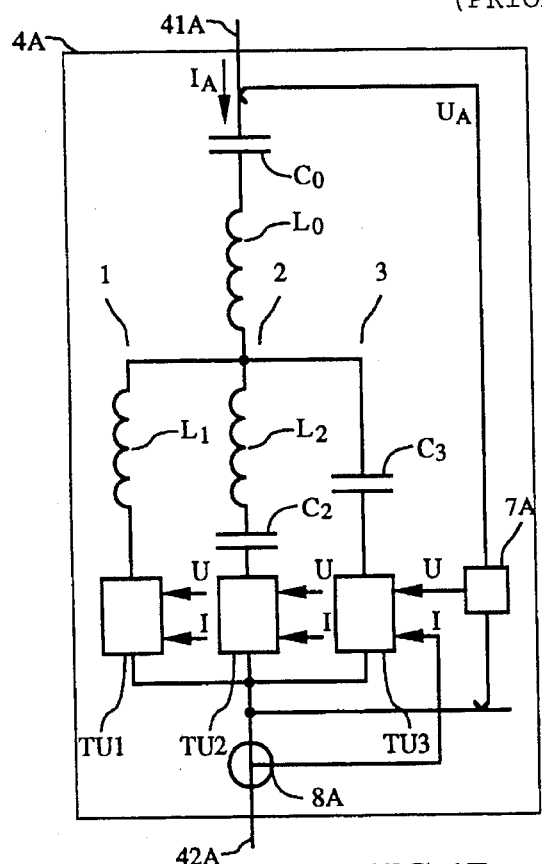
FIGS. 1B–1C show known embodiments of tunable filters.

The plant component 4A comprises a tunable filter according to FIG. 1B. The filter comprises a main capacitor $C_0$, a main reactor $L_0$ and three branches 1, 2, 3. The branch 1 comprises a reactor $L_1$, the branch 2 a reactor $L_2$ series connected to a capacitor $C_2$, and the branch 3 a capacitor $C_3$. By means of suitable choices of inductance values and capacitance values, respectively, for the reactors and capacitors included in the three branches, the filter may be tuned to three separate frequencies $f_1=n_1*f$, $f_2=n_2*f$ and $f_3=n_3*f$, where $n_1$, $n_2$ and $n_3$ are three mutually different integral numbers. The voltage $U_A$ across the filter is measured by means of a voltage-measuring member 7A, which delivers a signal U proportional to $U_A$, and the current $I_A$ through the filter is measured by means of a current-measuring member 8A, which delivers a signal I proportional to $I_A$. It is assumed that the current $I_A$ comprises components $I_{A/1}$, $I_{A/2}$, $I_{A/3}$ and that the voltage $U_A$ comprises components $U_{A/1}$, $U_{A/2}$, $U_{A/3}$ of the frequencies $f_1$, $f_2$ and $f_3$, respectively, whereby the tuning of the three branches results in at least the main part of the components $I_{A/1}$ flowing through the branch 1, at least the main part of the components $I_{A/2}$ flowing through the branch 2, and at least the main part of the components $I_{A/3}$ flowing through the branch 3. For the purpose of maintaining a correct tuning of the respective branch in connection with drift at network frequency and/or component values, in series with each branch a tuning unit TU1, TU2, TU3 is connected between the respective branch and ground. The signals U and I are supplied to the tuning units TU1, TU2 and TU3.

Figure 2A:
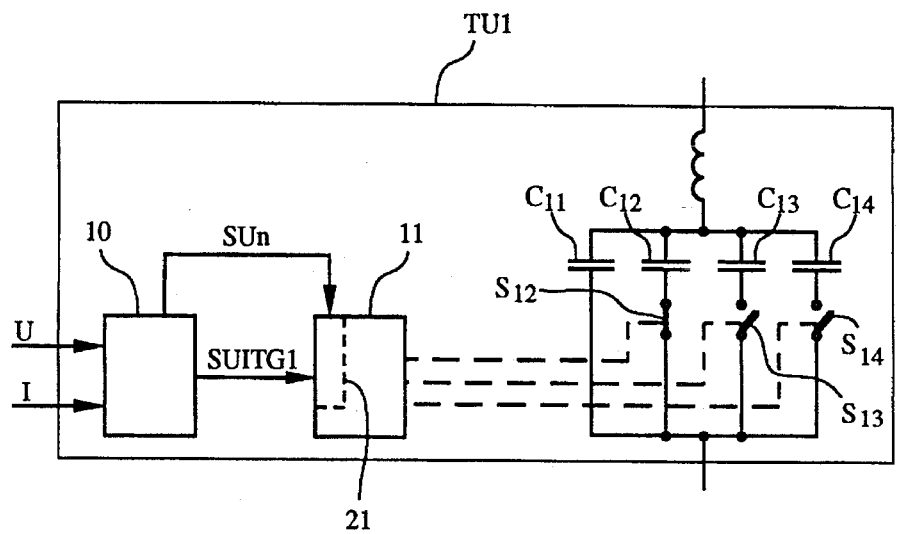
FIGS. 2A–2B show known embodiments of tuning units.

FIG. 2A shows an embodiment of the tuning unit TU1. It comprises a reactor $L_{11}$ and four capacitors $C_{11}$–$C_{14}$. The number of capacitors which are connected in series with the reactor $L_{11}$ may be controlled by means of the switching members $S_{12}$–$S_{14}$, shown in FIG. 2A as mechanical contacts. The capacitance values are preferably chosen such that the impedance of the tuning unit has its minimum when half the number of capacitor elements are connected to the reactor $L_{11}$. The signals U and I are supplied to a detector 10, which is adapted to generate a state signal SUITG1 in dependence on the phase difference between the voltage component $U_{A/1}$ and the current component $I_{A/1}$. The signal SUITG1 is supplied to a control unit 11 adapted, in dependence on the signal SUITG1, to activate the switching members $S_{12}$–$S_{14}$ $L_{11}$ such that the number of capacitors connected in series with the reactor $L_{11}$ is increased or reduced in such a way that the signal SUITG1, that is, the phase difference between the voltage component $U_{AF1}$ and the current component $I_{A/1}$, is automatically brought in a direction towards the value zero.

Figure 2B:
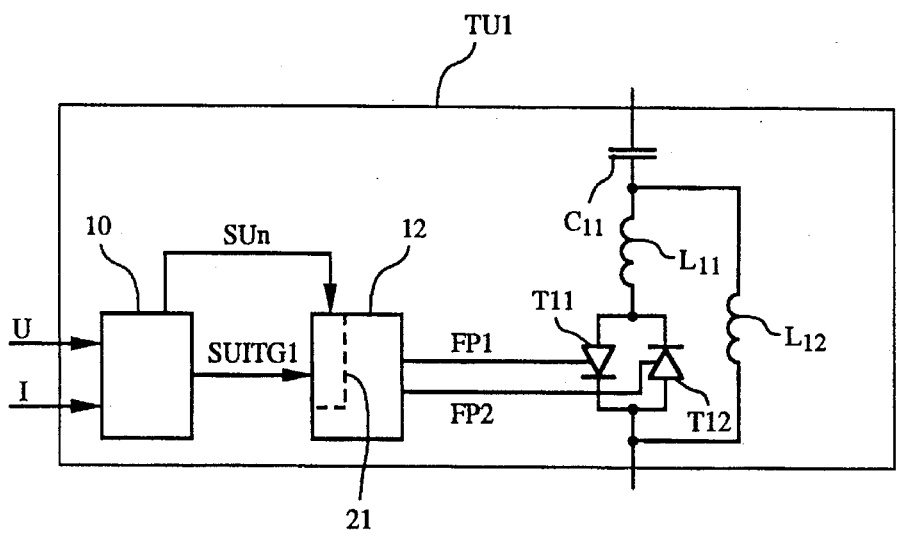

FIG. 2B shows another embodiment of the tuning unit TU1. A capacitor $C_{11}$ is connected in series with two reactors $L_{11}$ and $L_{12}$. The effective impedance for the reactor $L_{11}$ can be varied by means of variation of the control angle for firing pulses FP1, FP2, which are applied, with the frequency $f_1$, to two antiparallel-connected thyristors T11, T12 in series with the reactor $L_{11}$. The firing pulses are generated by a control pulse member 12 in dependence on the state signal SUITG1 in such a way that the phase difference between the voltage component $U_{AF1}$ and the current component $I_{A/1}$ is automatically brought in a direction towards the value zero.

The tuning units TU2 and TU3 are arranged in a similar manner to TU1 but with the difference that their respective state signals SUITG2 and SUITG3 are generated in dependence on the phase difference between the voltage component $U_{A/2}$ and the current component $I_{A/2}$, respectively, in dependence on the phase difference between the voltage component $U_{A/3}$ and the current component $I_{A/3}$.

Figure 1C:
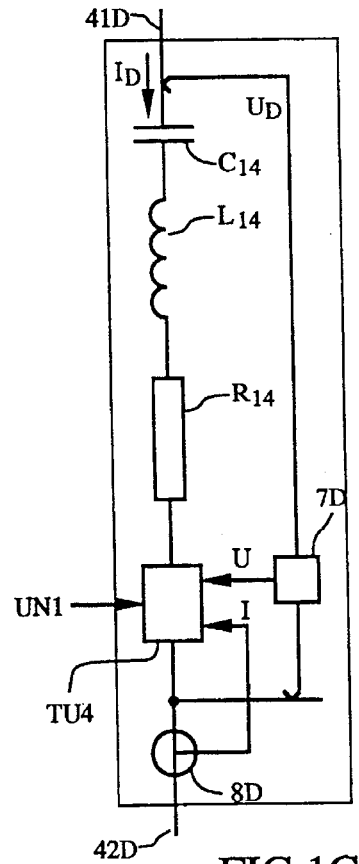

The plant component 4D comprises a tunable filter according to FIG. 1C. The filter comprises a capacitor $C_{14}$, a reactor $L_{14}$ and a resistor $R_{14}$ in series with a tuning unit TU4. By means of suitable choices of inductance and capacitance values of the reactor and of the capacitor, the filter can be tuned to a frequency $f_4=n_4*f$, where $n_4$ is an integral number. In a similar manner as for the parts 4A–-4C, the voltage $U_D$ across the filter is measured by means of a voltage-measuring member 7D which delivers a signal U proportional to $U_D$, and the current $I_D$ through the filter by means of a current-measuring member 8D which delivers a signal I proportional to $I_D$. The signals U and I and a signal UN1, the function of which will be described in greater detail below, are applied to the tuning unit TU4.

The tuning unit TU4 is arranged in a manner similar to TU1 but with the difference that its state signal SUITGI4 is generated in dependence on the phase difference between a voltage component $U_{A/4}$ and a current component $I_{A/4}$. The voltage-sensing member 7D may in this case be advantageously arranged to sense only a.c. voltage components of the voltage between the d.c. lines.

Figure 1D:
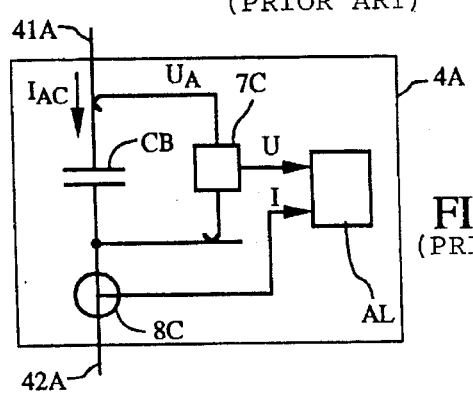
FIG. 1D shows=a capacitor bank with a monitoring unit.

The plant component 4A may also comprise or consist of a capacitor bank CB according to FIG. 1D. In similar manner to what has been described above, the voltage $U_A$ across the capacitor bank is measured by means of a voltage-measuring member 7C which delivers a signal U proportional to $U_A$, and the current $I_{AC}$ through the bank by means of a current-measuring member 8C which delivers a signal I proportional to $I_{AC}$. The signals U and I are supplied to a detector and alarm unit AL.

The method according to the invention is illustrated in the following description through block diagrams, the results of the operations symbolized by the blocks also being designated by a signal or a value.

Figure 3:
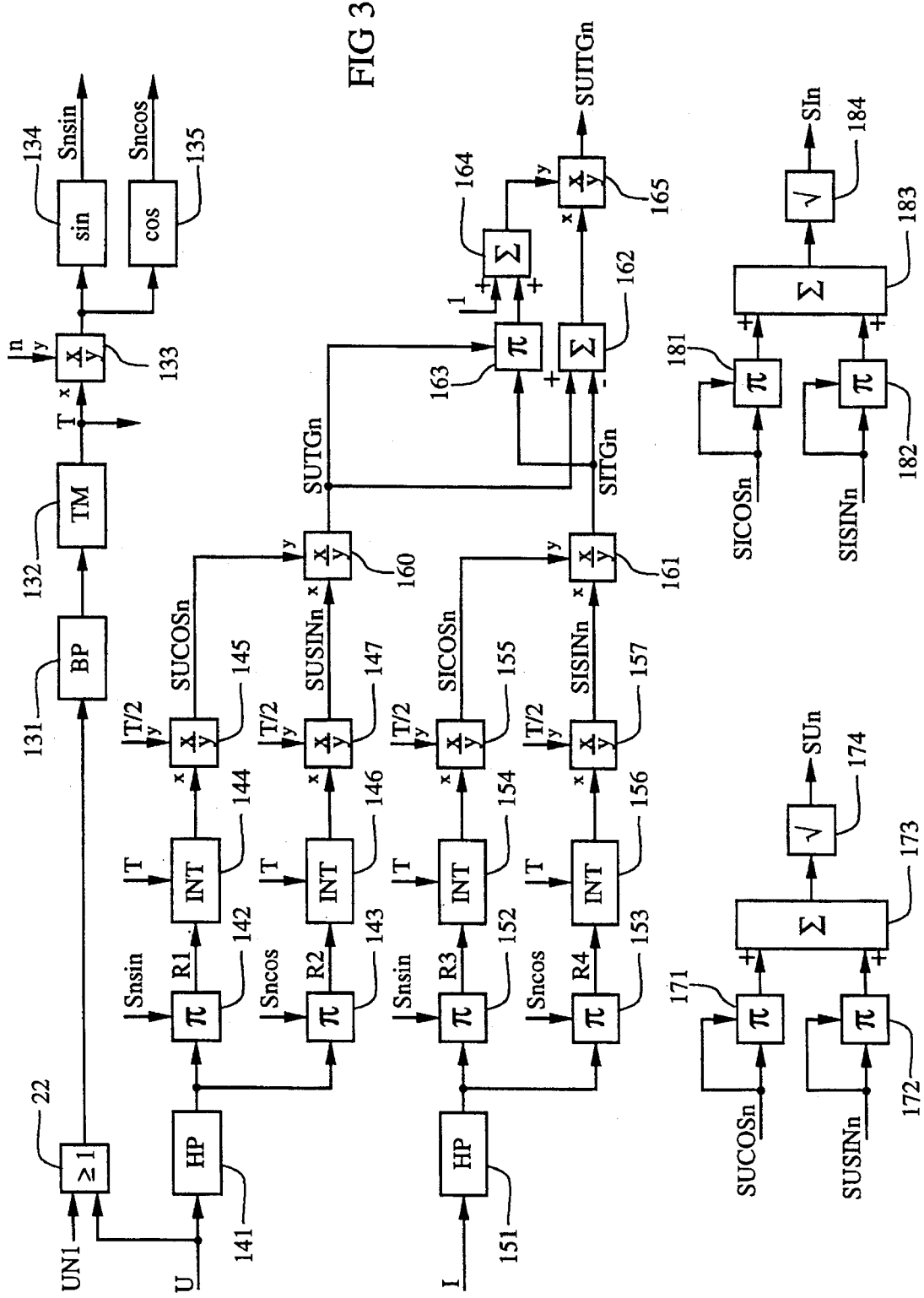
FIG. 3 shows in the form of a block diagram a method for determining the phase difference and the amplitude according to the invention.

FIG. 3 shows in the form of a block diagram a method for determining the phase difference and the amplitude according to the invention. A signal selected in a selector 22 is supplied to a bandpass filter 131 tuned to the fundamental frequency f of the power network N1. In the event that the method is applied to a filter connected to a d.c. network as shown for the plant component 4D in FIG. 1A, the above-mentioned signal UN1 is selected, which represents a value of a voltage or current sensed in the power network N1. In the event that the method is applied to a plant component connected to an a.c. network, the signal U is selected. In the implementation of the method, the selection is suitably performed such that one of the signals U and UN1 is connected to means for carrying out the method, whereby the selector 22 symbolizes the selection of connected voltage. A time-measuring circuit 132 senses the output signal from the bandpass filter and delivers a value T representing the period of the fundamental frequency. In a quotient generator 133, a quotient T/n is formed between the value T and a number n, where n is a positive integer which is the ordinal number of a selected tone in the power network. For, for example, a filter device on the a.c. side of a 12-pulse converter in a plan for high-voltage direct current, the number n may, for example, be selected at n=11 or n=13. For a filter device on the d.c. voltage side with the same application, the number n may, for example, be selected at n=12. The quotient T/n is supplied to a sine generator 134 adapted to generated sine signal Snsin of an angular frequency $n*2\pi t/T$, hat is, corresponding to the product of the ordinal number of the selected tone and the fundamental frequency associated with the power network, and a cosine generator 135 adapted to generate a cosine signal Sncos of an angular frequency of $n*2\pi t/T$.

The signal U is also supplied to a highpass filter 141, which is preferably adapted to block components of U of frequencies lower tan the frequency n/T. The output signal from the high-pass filter is supplied to a multiplier 142 for multiplication by the signal Snsin as well as to a multiplier 143 for multiplication by the signal Sncos. The result R1 from the multiplier 142 is supplied to an integrator 144, adapted to perform an integration over time for a period equal to the period T of the fundamental frequency, and the result of the integration is supplied to a quotient generator 145, in which it is divided by T/2. The result R2 from the multiplier 143 is supplied to an integrator 146, adapted to perform an integration over time for a period equal to the period T of the fundamental frequency, and the result of the integration is supplied to a quotient generator 147, in which it is divided by T/2.

It is now assumed that the signal U can be expressed as a Fourier series $$U(t) = U_0 + \sum_{k=1}^{\infty} U_k * \sin\left(\frac{k*2\pi t}{T} + \phi_k\right) \quad (1)$$

Form the signal S' by multiplying U(t) according to equation (1) by the factor $\sin n*2\pi t/T$, where n is a natural number 1, 2, 3, ..., integrate the product over the period T and divide by the factor T/2, and form the signal S'' by multiplying U(t) according to equation (1) by the factor $\cos n*2\pi t/T$, integrate the product over the period T and divide by the factor T/2, that is, $$S' = \frac{2}{T} * \int_{t=0}^{t=T} U(t) * \sin\frac{n*2\pi t}{T} dt \quad (2a)$$

$$S'' = \frac{2}{T} * \int_{t=0}^{t=T} U(t) * \cos\frac{n*2\pi t}{T} dt \quad (2b)$$

After development of the trigonometric term in equation (1) and insertion into equations (2a) and (2b) as well as further use of known trigonometric relationships and trigonometric integrals, the following is obtained $$S' = U_n * \cos \phi_n \quad (3a)$$

$$S'' = U_n * \sin \phi_n \quad (3b)$$

A direct comparison with FIG. 3 and the description in connection therewith shows that the result from the quotient generator 145, designated SUCOSn, is $$SUCOSn = U_n * \cos \phi_{un} \quad (4a)$$

and the result from the quotient generator 147, designated SUSINn, is $$SUSINn = U_n * \sin \phi_{un} \quad (4b)$$

where thus $U_n$ designates the amplitude and $\phi_{un}$ the phase angle for the component of the signal U which has the frequency $n*2\pi t/T$.

The signal I is supplied to a highpass filter 151, which is preferably adapted to block components of I of frequencies lower than the frequency n/T, and is thereafter treated in a manner analogous to that described above for the signal U in a multiplier 152 for multiplication by the signal Snsin, which provides the result R3, and a multiplier 153 for multiplication by the signal Sncos, which provides the result R4, integrators 154 and 156 and quotient generators 155 and 157. Based on a reasoning analogous to that regarding the signal U, it is realized that the result from the quotient generator 155, designated SICOSn, is $$SICOSn = I_n * \cos \phi_{In} \quad (5a)$$

and the result from the quotient generator 157, designated SISINn, is $$SISINn = I_n * \sin \phi_{In} \quad (5b)$$

where thus $I_n$ designates the amplitude and $\phi I_n$ the phase angle for the component of the signal I which has the frequency $n*2\pi t/T$.

The result SUSINn is divided by the result SUCOSn in a quotient generator 160, which gives the result SUTGn=tg $\phi_{un}$ and the result SISINn is divided by the result SICOSn in a quotient generator 161, which gives the result SSITGn=tg $\phi_{In}$. SITGn is subtracted from SUTGn in a summator 162 and SUTGn is multiplied by SITGn in a multiplier 163 whereafter the product is added to the number ONE in a summator 164. In a quotient generator 165 the result SUITGn is formed as the quotient between the result from the summator 162 and the summator 163.

A comparison with the known relationship tg $$(x - y) = \frac{tg\, x - tg\, y}{1 + tg\, x * tg\, y}$$

shows that the signal SUITGn is a measure of the phase difference between the signals U and I in that $$SUITGn = \frac{tg\phi_{un} - tg\phi_{In}}{1 + tg\phi_{un} * tg\phi_{In}} = tg(\phi_{un} - \phi_{In}) \qquad (6)$$

where $\phi_{un}$ is the phase angle for the component of the signal U which has the frequency $n*2\pi t/T$ and $\phi_{In}$ is the phase angle for the component of the signal I which has the frequency $n*2\pi t/T$.

The signal SUITGn may, after suitable signal adaptation, advantageously be supplied to a control unit 11 or a control pulse member 12 as described in connection with FIGS. 2A and 2B in that it is then possible to utilize the property of the tangent function to provide a high amplification at large phase differences and an amplification, decreasing with the phase difference, in the closed-loop control system which the system according to FIGS. 1–2 constitutes.

Alternatively, arctg(SUITGn), which is a direct measure of the phase difference ($\phi_{un}-\phi_{In}$) can be formed and, after suitable signal adaptation and signal processing comprising, for example, an integrating function, be supplied to the control unit 11 or the control pulse member 12.

By supplying to a multiplier 171 the result SUCOSn and to a multiplier 172 the result SUSINn and adding the products in a summator 173 and then in a calculating member 174 extracting the square root of the sum, SUn is obtained as a result, which, as realized from equations (4a) and (4b) and known trigonometric relationships, is a value of the amplitude $U_n$ for that component of the signal U which has the frequency $n*2\pi t/T$.

An analogous processing of the results SICOSn and SISINn in multipliers 181 and 82, in a summator 183 and in a calculating member 184 provides the result SIn, which, as is analogously realized, is a value of the amplitude $I_n$ of that component of the signal U which has the frequency $n*2\pi t/T$.

In an advantageous embodiment of the invention, a memory member which is arranged, for example, in the control unit 11 and in the control pulse member 12, respectively, and which is designated 21 in FIGS. 2A and 2B, is updated, continuously or periodically, with the current value of SUITGn. In this case, the switching member S12–S14 is activated and the firing pulses FP1 and FP2 are generated, respectively, in dependence on the value of the signal SUITGn stored in the memory. During a process when the tuning of the filter is changed in a direction towards its ideal value, both the phase difference between current and voltage for the filter, and hence the state signal SUITGn, and the magnitude of the voltage across the filter, and hence the signal US, will proceed towards zero. It is then advantageous to sense the magnitude of the amplitude signal SUn, for example in a comparison circuit arranged at the memory member, and when this magnitude is lower than a selected comparison level, to influence the memory member in some way known per se such that this member, as long as the magnitude of the amplitude signal USn remains lower than the comparison value, retains the value of SUITGn which prevailed when the magnitude of SUn became lower than the comparison level.

Figure 4A:
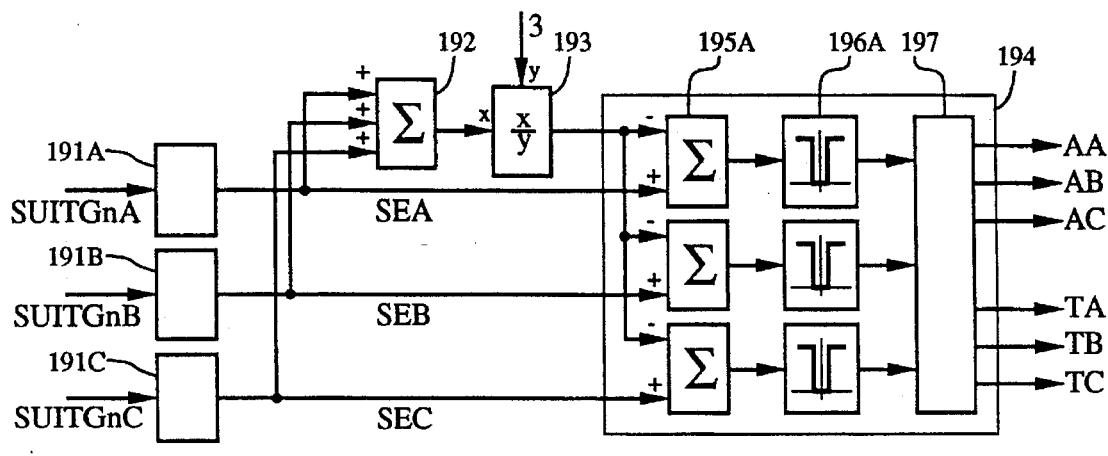
FIG. 4A shows in the form of a block diagram a method for monitoring three single-phase filters connected to a three-phase network according to another embodiment of the invention.

FIG. 4A shows in the form of a block diagram a method for monitoring faults in three single-phase filters connected to a three-phase network N with the phases A, B, C, for example a fault in one part of a capacitive impedance element in a tunable filter. Signals SUITGn are formed for each one of the filters and the value associated with the respective phase is designated SUITGnA, SUITGnB, SUITGnC. In dependence on these values, deviation values SEA, SEB and SEC are formed by signal processing in adaptation units 191A, 191B, 191C, which comprise an integrating function. The deviation values are added in a summator 192 and the result of the summation is divided by the number three in a quotient generator 193, the output signal of which thus forms a mean value of the deviation values. Each one of these deviation values along with the mentioned mean value are supplied to an alarm unit 194, in which each of the deviation values are compared in summators 195A, 195B, 195C with their mean value. The differences are compared in comparison members 196A, 196B, 196C with a predetermined value. The signals SUITGnA, SUITGnB and SUITGnC, which as described above are supplied to control units 11 or control pulse members 12 in the tuning units of the respective filters, achieve, by their function, a minimization of the respective phase differences. However, in the event that there should be a fault in one component of a filter, an influence should be exerted on those resonance-determining elements of this filter which deviate from the influence on the filters in which there is no fault. This is achieved by the corresponding adaptation unit 191A, 191B, 191C, by its integrating function, controlling the deviation value SEA, SEB, SEC to a value deviating from the other values. In the event that the deviation value exceeds the predetermined value mentioned above, a signal is delivered to an alarm member 197 which forwards an alarm AA, AB, AC, for example to an operator panel or to an overriding monitoring system in the plant. The comparison member 196A, 196B, 196C may, in a manner not shown in the figure, be doubled with an additional comparison level which, via the alarm member, delivers signals TA, TB, TC for disconnecting the corresponding filters from the power network.

Figure 4B:
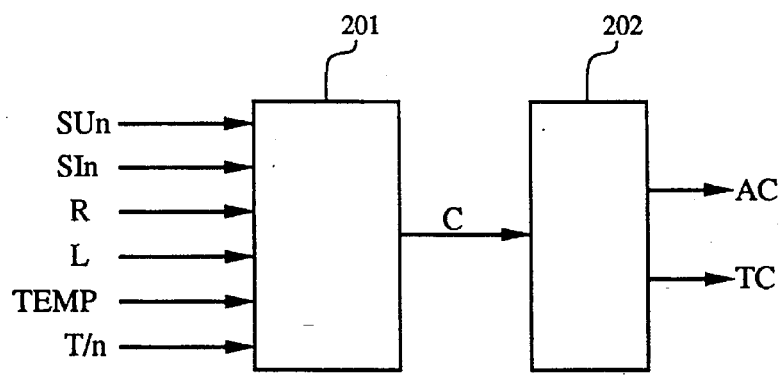
FIG. 4B shows in the form of a block diagram a method for monitoring a single-phase filter or a capacitor bank according to another embodiment of the invention.

FIG. 4B shows in the form of a block diagram a method for monitoring a single,phase plant component, which can be used to advantage when monitoring non-tunable filters and capacitor banks. The values SUn, SIn, formed according to the above, of the amplitude $U_n$ and of the amplitude $I_n$, respectively, for that component of the signals U and I which has the frequency $n*2\pi t/T$, are supplied to a calculating unit 201. Furthermore, there are supplied to this calculating unit known values R and L of the resistance and inductance of the monitored plant component as well as a value of the period T/n of the selected tone. In the calculating unit a calculation of the impedance $X_n$ of the plant component at the frequency $n*2\pi t/T$ is performed as $$X_n = SUn/SIn = U_n/I_n = \sqrt{R^2 + (X_C + X_L)^2} \qquad (7)$$

where, in equation (7), R denotes the resistance of the plant component, $X_C$ the capacitive reactance thereof and $X_L$ the inductive reactance thereof. From this, the capacitance C of the capacitive element can be calculated when R, L and T/n are known. In the event that the monitored plant component constitutes; a tunable filter, whose reactive impedance is influenced by means of a controllable reactor, the value of the inductance L may be derived from the relationship between the inductance value L and the state signal SUITGn, or a signal dependent thereon, which relationship is given by the dimensioning of the system. In the calculation it is advantageous to correct, in a manner known per se, for the temperature dependence of at least the capacitive element by supplying to the calculating member a value TEMP of the current ambient temperature or another temperature value related to the operating temperature thereof. Further, it is advantageous in this case to utilize, for the calculation of C, the fundamental frequency associated with the power network, that is, to select the tone with the ordinal number corresponding to n=1. The value of the capacitance C thus calculated is supplied to an alarm unit 202 for comparison with a known nominal value. In dependence on the magnitude of the deviation, the alarm unit may forward an alarm AC, for example to an operator panel or to an overriding monitoring system in the plant and/or, at a certain level of the deviation, a signal TC for disconnecting the plant component from the power network.

In multi-phase plants the method illustrated in FIG. 4B may be applied to plant components in each one of the phases.

The method illustrated in FIG. 4A may also be applied for the case where several plant components have been connected to the same phase or line in the power network.

The integration which is performed in the integrators 144, 146, 154, 156 may also be extended to comprise a plurality of the periods T of the fundamental frequency, in which case the magnitude of the divisor in the quotient generators 145, -147, 155, 157 may be adapted to the selected number of periods.

As an alternative to measuring the total voltage across the plant component in question, voltage may instead, where applicable, be measured across a component in the plant component which is suitable for the purpose.

The period T may, oil course, also, within the inventive concept, be determined as the inverse of the measured value of the frequency in the power network N1.

While it is advantageous to high-pass filter the signals U and I, this is not necessary to carry out the method according to the invention.

The invention may, in applicable parts, be implemented as calculations carried out in a computer or, alternatively, be performed in hard-wired circuits operating according to analog and/or digital technique.

We claim:

1. A method for monitoring and controlling a plant component, for a tunable filter for harmonic filtering in a converter plant for high-voltage direct current, connected to an electric power network with a fundamental frequency corresponding to a period T, said component having a reactive impedance changeable via a control member, comprising the steps of:

sensing a voltage occurring in the plant component and a current flowing through the plant component;

forming the phase difference between a selected tone of said sensed voltage and of said sensed current, the selected tone having a frequency equal to an integer multiple of said fundamental frequency ($n \times 2\pi t/T$, where n is a positive integer);

forming a state signal SUITGn in dependence on said phase difference; and supplying the state signal to the control member for changing the reactive impedance of the plant component such that the magnitude of said phase difference is minimized;

wherein said step of forming the phase difference further comprises the steps of:

(a) forming a sine and a cosine signal, both of a frequency equal to the frequency of the selected tone;

(b) forming a first product R1 in dependence on the product between the sensed value of aid voltage and the sine signal, forming a second product R2 in dependence on the product between the sensed value of said voltage and the cosine signal, forming a third product R3 in dependence on the product between the sensed value of said current and the sine signal, and forming a fourth product R4 in dependence on the product between the sensed value of said current and the cosine signal;

(c) integrating each of said first, second, third and fourth products over at leas one of time equal to said period and a multiple of said period; and (d) forming respective signals SUCOSn, SUSINn, SICOSn and SISINn in dependence on the integrated first, second, third and fourth products, and forming the state signal in dependence on a quotient SUTGn of the signal SUSINn and the signal SUCOSn and on a quotient SITGn of the signal SISINn and the signal SICOSn.

2. A method according to claim 1, wherein the forming of the state signal in dependence on said quotient SUTGn and said quotient SITGn further comprising the steps of:

multiplying said quotient SUTGn by said quotient SITGn and adding the result to "ONE" to form a summation; and generating the difference between said quotient SUTGn and said quotient SITGn and dividing said difference by said summation and forming the state signal in dependence on the resultant division.

3. A method according to claim 1, wherein the frequency of the selected tone is determined as the product of a selected integer and a sensed value of the fundamental frequency associated with the power network.

4. A method for monitoring at least two plant components, for harmonic filters in a converter station for high-voltage direct current, connected to an electric power network with a fundamental frequency corresponding to a period T, comprising the steps of:

sensing, for each one of the at least two plant components, a voltage occurring in the plant component and a current flowing through the plant component;

forming the phase difference between a selected tone of said sensed voltage and of said sensed current, the selected tone having a frequency equal to an integer multiple of said fundamental frequency ($n \times 2\pi t/T$, where n is a positive integer);

forming a state signal SUITGn in dependence on said phase difference; and supplying the state signal to an alarm unit for comparison with a state signal formed in dependence on phase difference for more than one of the plant components connected to the power network;

wherein said step of forming the phase difference further comprises the steps of:

(a) forming a sine and a cosine signal, both of a frequency equal to the frequency of the selected tone;

(b) forming a first product R1 in dependence on the product between the sensed value of said voltage and the sine signal, forming a second product R2 in dependence on the product between the sensed value of said voltage and the cosine signal, forming a third product R3 in dependence on the product between the sensed value of said current and the sine signal, and forming a fourth product R4 in dependence on the product between the sensed value of said current and the cosine signal;

(c) integrating each of said first, second, third and fourth products over at least one of a time equal to said period and a multiple of said period; and (d) forming respective signals SUCOSn, SUSINn, SICOSn and SISINn in dependence on the integrated first, second, third and fourth products, and forming the state signal in dependence on a quotient SUTGn of the signal SUSINn and the signal SUCOSn and on a quotient SITGn of the signal SISINn and the signal SICOSn.

5. A method according to claim 4, wherein the forming of the state signal in dependence on said quotient SUTGn and said quotient SITGn further comprising the steps of:

multiplying said quotient SUTGn by said quotient SITGn and adding the result to "ONE" to form a summation; and generating the difference between said quotient SUTGn and said quotient SITGn and dividing said difference by said summation and forming the state signal in dependence on the resultant division.

6. A method according to claim 4, further comprising the steps of:

forming, for each one of the plant components, a signal in dependence on the phase difference; and supplying said signal to the alarm unit for comparison with a signal formed in dependence on the mean value of the phase difference for more than one of the plant components connected to the power network.

7. A method according to claim 4, wherein the frequency of the selected tone is determined as the product of a selected integer and a sensed value of the fundamental frequency associated with the power network.

8. A method for monitoring a plant component comprising at least one capacitive impedance element, comprising at least one of a filter for harmonic filtering and a capacitive bank for generating reactive power in a converter plant for high-voltage direct current, connected to an electric power network with a fundamental frequency corresponding to a period T, comprising the steps of:

sensing a voltage occurring in the plant component and a current flowing through the plant component;

forming amplitude values for a selected tone of said sensed voltage and of said sensed current, the selected tone having a frequency equal to an integer multiple of said fundamental frequency (n×2πt/T, where n is a positive integer);

supplying the amplitude values, a value of the frequency of the selected tone or the corresponding period T/n thereof, a known value of the resistance of the plant component, and a known value of the inductance of the plant component to a calculating unit for calculating the value of the capacitance of the capacitive impedance element in dependence on said supplied values; and supplying said calculated value of the capacitance of the capacitive impedance element to an alarm unit for comparison with a predetermined reference value;

wherein said step of forming the amplitude values further comprising the steps of:

(a) forming a sine and a cosine signal, both of a frequency equal to the frequency of the selected tone;

(b) forming a first product R1 in dependence on the product between the sensed value of said voltage and the sine signal, forming a second product R2 in dependence on the product between the sensed value of said voltage and the cosine signal, forming a third product R3 in dependence on the product between the sensed value of said current and the sine signal, and forming a fourth product R4 in dependence on the product between the sensed value of said current and the cosine signal;

(c) integrating each of said first, second, third and fourth products over at least one of a time equal to said period and a multiple of said period; and (d) forming respective signals SUCOSn, SUSINn, SICOSn and SISINn in dependence on the integrated first, second, third and fourth products, and forming the state signal in dependence on a quotient SUTGn of the signal SUSINn and the signal SUCOSn and on a quotient SITGn of the signal SISINn and the signal SICOSn.

9. A method according to claim 8, wherein the frequency of the selected tone is determined as the product of a selected integer and a sensed value of the fundamental frequency associated with the power network.

10. A method according to claim 8, wherein the step of forming said amplitude values further comprises the steps of:

respectively square said signals SUCOSn, SUSINn, SICOSn and SISINn;

summing the squares of said signals SUCOSn and SUSINn and taking the square root of the resultant summation to form a signal SUn;

summing the squares of said signals SICOSn and SISINn and taking the square root of the resultant summation to form a signal SIn; and forming said amplitude value for the selected tone of said sensed voltage in dependence on said signal SUn and forming said amplitude value for the selected tone of said sensed current in dependence on said signal SIn.

11. A method according to claim 10, further comprising the step of supplying said calculating unit with a value related to the operating temperature of at least the capacitive impedance elements, for example the operating temperature of the plant component, to be included as a parameter in the calculation of the value of the capacitance of the capacitive impedance element.

12. Apparatus for monitoring and controlling a plant component, for a tunable filter for harmonic filtering in a converter plant for high-voltage direct current, connected to an electric power network with a fundamental frequency corresponding to a period T, said component having a reactive impedance changeable via a control member, comprising:

means for sensing a voltage occurring in the plant component and a current flowing through the plant component;

means for forming the phase difference between a selected tone of said sensed voltage and of said sensed current, the selected tone having a frequency equal to an integer multiple of said fundamental frequency (n×2πt/T, where n is a positive integer);

means for forming a state signal SUITGn in dependence on said phase difference; and means for supplying the state signal to the control member for changing the reactive impedance of the plant component such that the magnitude of said phase difference is minimized;

wherein said means for forming the phase difference further comprises:

(a) means for forming a sine and a cosine signal, both of a frequency equal to the frequency of the selected tone;

(b) means for forming a first product R1 in dependence on the product between the sensed value of said voltage and the sine signal, means for forming a second product R2 in dependence on the product between the sensed value of said voltage and the cosine signal, means for forming a third product R3 in dependence on the product between the sensed value of said current and the sine signal, and means for forming a fourth product R4 in dependence on the product between the sensed value of said current and the cosine signal;

(c) means for integrating each of said first, second, third and fourth products over at least one of a time equal to said period and a multiple of said period; and (d) means for forming respective signals SUCOSn, SUSINn, SICOSn and SISINn in dependence on the integrated first, second, third and fourth products, and forming the state signal in dependence on a quotient SUTGn of the signal SUSINn and the signal SUCOSn and on a quotient SITGn of the signal SISINn and the signal SICOSn.

13. Apparatus according to claim 12, wherein the means for forming the state signal in dependence on said quotient SUTGn and said quotient SITGn further comprising:

means for multiplying said quotient SUTGn by said quotient SITGn and means for adding the result to "ONE" to form a summation; and means for generating the difference between said quotient SUTGn and said quotient SITGn and dividing said difference by said summation and forming the state signal in dependence on the resultant division.

14. Apparatus according to claim 12, further comprising means for determining the frequency of the selected tone as the product of a selected integer and a sensed value of the fundamental frequency associated with the power network.

15. Apparatus for monitoring at least two plant components, for harmonic filters in a converter station for high-voltage direct current, connected to an electric power network with a fundamental frequency corresponding to a period T, comprising:

means for sensing, for each one of the at least two plant components, a voltage occurring in the plant component and a current flowing through the plant component;

means for forming the phase difference between a selected tone of said sensed voltage and of said sensed current, the selected tone having a frequency equal to an integer multiple of said fundamental frequency ($n \times 2\pi t/T$, where n is a positive integer);

means for forming a state signal SUITGn in dependence on said phase difference; and means for supplying the state signal to an alarm unit for comparison with a state signal formed in dependence on phase differences for more than one of the plant components connected to the power network;

wherein said means for forming the phase difference further comprises:

(a) means for forming a sine and a cosine signal, both of a frequency equal to the frequency of the selected tone;

(b) means for forming a first product R1 in dependence on the product between the sensed value of said voltage and the sine signal, means for forming a second product R2 in dependence on the product between the sensed value of said voltage and the cosine signal, means for forming a third product R3 in dependence on the product between the sensed value of said current and the sine signal, and means for forming a fourth product R4 in dependence on the product between the sensed value of said current and the cosine signal;

(c) means for integrating each of said first, second, third and fourth products over at least one of a time equal to said period and a multiple of said period; and (d) means forming respective signals SUCOSn, SUSINn, SICOSn and SISINn in dependence on the integrated first, second, third and fourth products, and forming the state signal in dependence on a quotient SUTGn of the signal SUSINn and the signal SUCOSn and on a quotient SITGn of the signal SISINn and the signal SICOSn.

16. Apparatus according to claim 15, wherein the means for forming the state signal in dependence on said quotient SUTGn and said quotient SITGn further comprising:

means for multiplying said quotient SUTGn by said quotient SITGn and adding the result to "ONE" to form a summation; and means for generating the difference between said quotient SUTGn and said quotient SITGn and dividing said difference by said summation and forming the state signal in dependence on the resultant division.

17. Apparatus according to claim 15, further comprising:

means for forming, for each one of the plant components, a signal in dependence on the phase difference; and means for supplying said signal to the alarm unit for comparison with a signal formed in dependence on the mean value of the phase difference for more than one of the plant components connected to the power network.

18. Apparatus according to claim 15, further comprising means for determining the frequency of the selected tone as the product of a selected integer and a sensed value of the fundamental frequency associated with the power network.

19. Apparatus for monitoring a plant component comprising at least one capacitive impedance element, comprising at least one of a filter for harmonic filtering and a capacitive bank for generating reactive power in a converter plant for high-voltage direct current, connected to an electric power network with a fundamental frequency corresponding to a period T, comprising:

means for sensing a voltage occurring in the plant component and a current flowing through the plant component;

means for forming amplitude values for a selected tone of said sensed voltage and of said sensed current, the selected tone having a frequency equal to an integer multiple of said fundamental frequency ($n \times 2\pi t/T$, where n is a positive integer);

means for supplying the amplitude values, a value of the frequency of the selected tone or the corresponding period T/n thereof, a known value of the resistance of the plant component, and a known value of he inductance of the plant component to a calculating unit for calculating the value of the capacitance of the capacitive impedance element in dependence on said supplied values; and means for supplying said calculated value of the capacitance of the capacitive impedance element to an alarm unit for comparison with a predetermined reference value;

wherein said means for forming the amplitude values further comprising:

(a) means for forming a sine and a cosine signal, both of a frequency equal to the frequency of the selected tone;

(b) means for forming a first product R1 in dependence on the product between the sensed value of said voltage and the sine signal, means for forming a second product R2 in dependence on the product between the sensed value of said voltage and the cosine signal, means for forming a third product R3 in dependence on the product between the sensed value of said current and the sine signal, and means for forming a fourth product R4 in dependence on the product between the sensed value of said current and the cosine signal;

(c) means for integrating each of said first, second, third and fourth products over at least one of a time equal to said period and a multiple of said period; and (d) means for forming respective signals SUCOSn, SUSINn, SICOSn and SISINn in dependence on the integrated first, second, third and fourth products, and means for forming the state signal in dependence on a quotient SUTGn of the signal SUSINn the signal SUCOSn and on a quotient SITGn of the signal SISINn and the signal SICOSn.

20. Apparatus according to claim 19, further comprising means for determining the frequency of the selected tone as the product of a selected integer and a sensed value of the fundamental frequency associated with the power network.

21. Apparatus according to claim 19 wherein the means for forming said amplitude values further comprises:

means for respectively squaring said signals SUCOSn, SUSINn, SICOSn and SISINn;

means for summing the squares of said signals SUCOSn and SUSINn and taking the square root of the resultant summation to form a signal SUn; and means for summing the squares of said signals SICOSn and SISINn and taking the square root of the resultant summation to form a signal SIn; and means for forming said amplitude value for the selected tone of said sensed voltage in dependence on said signal SUn and forming said amplitude value for the selected tone of said sensed current in dependence on said signal SIn.

22. Apparatus according to claim 21, further comprising: means for supplying said calculating unit with a value related to the operating temperature of at least the capacitive impedance elements, for example the operating temperature of the plant component, to be included as a parameter in the calculation of the value of the capacitance of the capacitive impedance element.

* * * * *